May 3, 1938.  H. H. HAIRE  2,115,713
FLEXIBLE CONNECTER
Filed Dec. 5, 1936
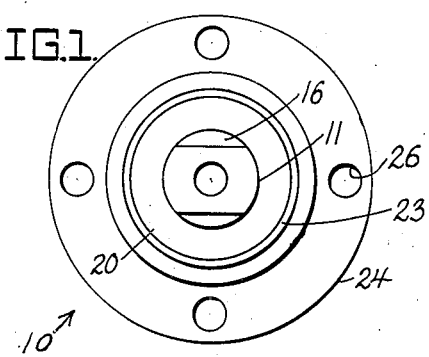
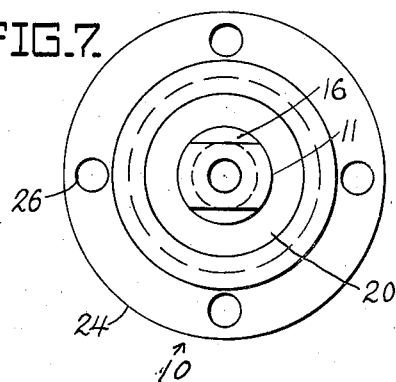
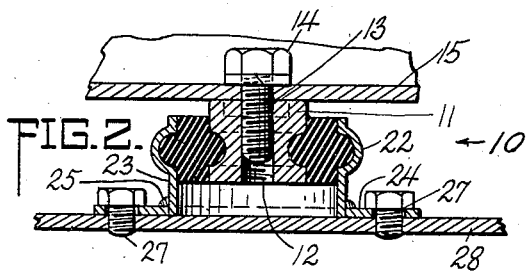
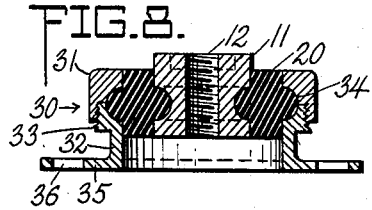
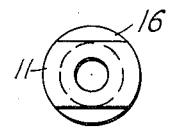
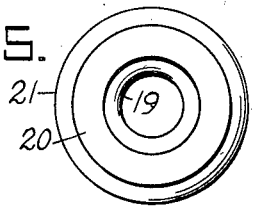
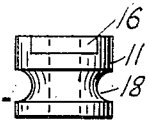
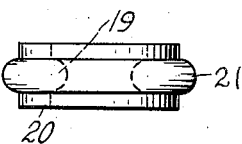
INVENTOR
HOMER H. HAIRE.
BY Robert A. Lavender
ATTORNEY Patented May 3, 1938

2,115,713

UNITED STATES PATENT OFFICE 2,115,713

FLEXIBLE CONNECTER

Homer H. Haire, Washington, D. C.

Application December 5, 1936, Serial No. 114,341

1 Claim. (Cl. 248—358)

(Granted under the act of March 3, 1883, as amended April 30, 1928; 370 O. G. 757)

This invention relates to a flexible connecter especially adapted for use as a vibration dampener, and particularly intended for mounting static or vibratory loads in any position, either as a supporting base, as a suspension means from directly overhead, or as a support on an angular or vertical wall.

A further object of this invention is to provide a flexible connecter as a vibration dampener eliminating transmission of any vibration therethrough, and including a cushioning element which acts to prevent any metal to metal contact between the supported load and the supporting surface.

A further object of this invention is to provide a flexible connecter wherein the cushioning element is of rubber, and wherein the rubber and the metallic elements in which the rubber is mounted are so associated that vulcanizing or bonding of the rubber to the metallic surfaces is unnecessary, and wherein failure cannot possibly occur except through shear of the cushioning element.

With the foregoing and other objects in view, the invention consists in the construction, combination and arrangement of parts, as will be described more fully hereafter.

In the drawing:

Fig. 1 is a top view of one form of this invention in operative position;

Fig. 2 is a sectional view of the flexible connecter of this invention;

Fig. 3 is a top plan view of the internally threaded spool;

Fig. 4 is an elevational view of the spool of Fig. 3;

Fig. 5 is a top plan view of the rubber cushioning element;

Fig. 6 is an elevational view of the cushioning element of Fig. 5;

Fig. 7 is a top plan view of Fig. 8, and

Fig. 8 is a sectional view of a slightly modified form of the invention.

There is shown at 10 one form of the flexible connecter of this invention. This flexible connecter 10 includes a spool 11 which is internally threaded as at 12 to receive the shank 13 of a bolt 14 when connecting a load 15 thereto. The spool 11 has its upper edge partly cut away as at 16 in order to provide wrench-receiving surfaces, if necessary. The side of the spool 11 is recessed as at 18 in order to receive an internally projecting rib 19 of the cylindrical cushioning element 20 therein. The cylindrical cushioning element 20 is provided with an externally projecting rib 21 which is receivable within a channel 22 formed on thimble 23. The thimble 23 is adapted to be secured to a flange or washer 24 as by welding 25, the flange or washer 24 being provided with a series of bolt-receiving apertures 26 through which may extend stud bolts 27 for securing the connector 10 to a base or supporting surface 28.

In the form of the invention shown in Fig. 8 the spindle 30 is made in two cooperative sections 31 and 32, adapted to be threaded together as at 33 to provide a channel 34 for receiving the rib 21. The lower part 32 has a flange 35 integrally extending therefrom and provided with bolt apertures 36.

In assembling the flexible connecter in the form shown at 10 the cushioning element 20 has its rib 19 forcibly passed over the spool 11 until it enters into the recess 18. The thimble 23 is then placed over the rib 21 until the rib 21 enters the channel 22, thus completing the assembly of the unit.

In the form shown in Fig. 8 the spool 30 is assembled from opposite sides of the rib 21 so that the channel 34 is placed about the rib 21 without the necessity of forcing the spool 30 thereover.

Other modifications and changes in the proportions and arrangements of the parts may be made by those skilled in the art without departing from the nature and scope of the invention, as defined in the appended claim.

The invention described herein may be manufactured and used by or for the Government of the United States of America for governmental purposes without the payment of any royalties thereon or therefor.

Having thus set forth and disclosed the nature of this invention, what is claimed is:

A shear type flexible connecter comprising a cylindrical cushioning element having an internally and an externally projecting semicircular rib in unstressed condition, a cylindrical spool having a circular recess corresponding in size to the internal rib adapted to be inserted within said cylindrical cushioning element, and a cylindrical thimble having a channel corresponding in size and shape to the external rib adapted to be placed over the cylindrical rib whereby said ribs hold said cushioning element locked in between said spindle and spool for loading in shear distortion, and securing means in said spool and on said thimble.

HOMER H. HAIRE.